United States Patent
Sitaram et al.

(10) Patent No.: US 11,258,494 B1
(45) Date of Patent: Feb. 22, 2022

(54) METHOD AND SYSTEM FOR CONTROLLING AIR-INTERFACE RESOURCE AVAILABILITY THROUGH DYNAMIC CONFIGURATION OF ANTENNA STRUCTURES

(71) Applicant: Sprint Spectrum L.P., Overland Park, KS (US)

(72) Inventors: Krishna Sitaram, Chantilly, VA (US); Hemanth B. Pawar, Brambleton, VA (US); Shilpa K. Srinivas, Brambleton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 174 days.

(21) Appl. No.: 16/373,335

(22) Filed: Apr. 2, 2019

(51) Int. Cl.
*H04B 7/06* (2006.01)
*H04W 24/08* (2009.01)
*H04B 7/0413* (2017.01)
*H04W 88/08* (2009.01)

(52) U.S. Cl.
CPC ......... *H04B 7/0613* (2013.01); *H04B 7/0413* (2013.01); *H04W 24/08* (2013.01); *H04W 88/08* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,754,541 A | * | 5/1998 | Glisic | H04B 7/2628 370/335 |
| 2010/0056217 A1 | | 3/2010 | Montojo et al. | |
| 2014/0016681 A1 | * | 1/2014 | Muruganathan | H04B 7/0671 375/219 |
| 2014/0113676 A1 | * | 4/2014 | Hamalainen | H04W 72/046 455/522 |
| 2015/0071379 A1 | * | 3/2015 | Choi | H04W 52/0274 375/295 |

FOREIGN PATENT DOCUMENTS

WO 2011/088403 7/2011

OTHER PUBLICATIONS

Byung Moo Lee, "Simplified Antenna Group Determination of RS Overhead Reduced Massive MIMO for Wireless Sensor Networks," www.mdpi.com/journal/sensors, Sensors 2018, 18, 84:doi:10.3390/s18010084, published: Dec. 29, 2017.

* cited by examiner

*Primary Examiner* — Linda Wong

(57) ABSTRACT

A base station or an associated control entity determines when base station's air interface is threshold highly loaded or is predicted to be threshold highly loaded, and the base station responsively reduces the number of transmit antennas that the base station uses. Further, the base station or associated control entity could determine when the base station's air interface is no longer actually or predicted to be threshold highly loaded, and the base station could responsively increase the number of transmit antennas that the base station uses, such as by reverting to use a default number of antennas. Reducing the number of transmit antennas that the base station uses when its air interface is threshold highly loaded may help to increase air-interface capacity by reducing resource consumption from transmission of reference signals associated with the transmit antennas.

20 Claims, 7 Drawing Sheets

METHOD AND SYSTEM FOR CONTROLLING AIR-INTERFACE RESOURCE AVAILABILITY THROUGH DYNAMIC CONFIGURATION OF ANTENNA STRUCTURES

BACKGROUND

A cellular wireless network typically includes a number of base stations that are configured to provide wireless coverage areas, such as cells and cell sectors, in which user equipment devices (UEs) such as cell phones, tablet computers, tracking devices, embedded wireless modules, and other wirelessly equipped communication devices (whether or not user operated), can operate. In turn, each base station could be coupled with network infrastructure that provides connectivity with one or more transport networks, such as the public switched telephone network (PSTN) and/or the Internet for instance. With this arrangement, a UE within coverage of the network could engage in air interface communication with a base station and could thereby communicate via the base station with various remote network entities or with other UEs served by the base station.

Such a network could operate in accordance with a particular radio access technology, with air-interface communications from the base stations to UEs defining a downlink or forward link and air-interface communications from the UEs to the base stations defining an uplink or reverse link.

Over the years, the industry has embraced various generations of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive-MIMO, beamforming, and/or other features, to support higher data rates and countless applications, such as mission-critical services, enhanced mobile broadband, and massive Internet of Things (IoT).

In accordance with some radio access technologies, each coverage area could operate on one or more carriers, each of which could be frequency division duplex (FDD), defining separate frequency channels (each with respective a bandwidth and center frequency) for downlink and uplink communication, or time division duplex (TDD), with a single frequency channel (having a single bandwidth and center frequency) multiplexed over time between downlink and uplink use.

Further, on the downlink and uplink, the air interface of the coverage area on each of one or more carriers could be structured to define a set of resources for carrying information between the base stations and UEs. For example, under some radio access technologies, the air interface could be divided over frequency into subcarriers and over time into frames, subframes, timeslots, and symbol time segments. As such, the air interface could define an array of resource elements each occupying a subcarrier and a symbol time segment, and the subcarrier of each resource element could be modulated to carry data. The resource elements within each timeslot on the carrier could then be grouped to define physical resource blocks (PRBs) that could be allocated for use to carry information on as as-needed basis.

OVERVIEW

Under various radio access technologies, MIMO technology can enable a base station to engage in air interface communication concurrently on multiple different radio-frequency (RF) propagation paths, or MIMO "layers," with multiple layers possibly occupying the same air interface resources (e.g., PRBs and associated subcarriers) as each other.

To facilitate this, the base station could be equipped with a MIMO antenna array, comprising multiple transmit antennas and multiple receive antennas. By suitably weighting and precoding transmissions by particular antennas in the array, the base station can then output separate but concurrent transmissions for receipt by its served UEs.

MIMO service could be used in a single-user MIMO (SU-MIMO) configuration to increase the data rate of transmission to a single UE, by multiplexing communications to the UE onto multiple separate layers using the same air-interface resources as each other. For instance, when a base station has data to transmit to a UE, the base station could time-division-multiplex the data into multiple data streams, the base station could modulate the data streams onto the same PRBs as each other, and the base station could output the modulated data streams onto separate antenna ports for concurrent transmission on separate respective propagation paths to the UE. In practice, the UE could have two or more antennas, and the UE could estimate the channel distortion at each of its antennas and use the estimates to separately compute and uncover each of the base station's transmit signals. In theory, SU-MIMO could thus increase the data rate of communication to a UE by a multiple equal to the number of propagation paths, without requiring use of additional air-interface resources.

Further, MIMO can also be used in a multi-user MIMO (MU-MIMO) configuration to increase the data capacity of the air interface by allowing communications to multiple UEs to use the same air-interface resources as each other. For instance, a base station can modulate data streams destined to each of multiple UEs on the same PRBs as each other and can transmit the modulated data streams on a separate respective propagation paths for receipt by the different UEs. To facilitate this, the base station could pre-code transmissions on each propagation path using weighted coefficients based on channel estimates from the UEs, in a manner that enables each UE to remove cross-talk and receive its intended data. In theory, MU-MIMO could thus increase the data capacity of the air interface by allowing a base station to serve more UEs at a time without requiring use of additional air-interface resources.

To enable UEs to provide channel estimates respectively for each such propagation path so as to facilitate downlink MIMO service, the base station could make use of special downlink reference signals. In particular, the base station could transmit a distinct downlink reference signal respectively from each of the base station's antennas. And the base station could engage in signaling with UEs to cause the UEs to determine channel characteristics of certain of these reference signals and to report the results to the base station.

The base station could configure each such reference signal to occupy a respective set of the resource elements defined by the air interface. For instance, the reference signal that the base station transmits from a given antenna could be provided on certain predefined subcarriers within certain predefined symbol time segments per timeslot. Further, the reference signal that the base station transmits respectively from each antenna could be configured to occupy different such resource elements than the reference signal that the base station transmits respectively from each other antenna. And to help avoid or minimize interference between these reference signals, the base station might configure transmission from each antenna to blank out (e.g., zero-out, or not use) the resource elements that are used for reference-signal transmission from the other antenna(s).

Unfortunately, however, this reference-signal arrangement could result in decreased air-interface capacity, because the resource elements that are used for transmission of reference signals would not be available for use to modulate other information, such as user data or control signaling. In turn, this decreased air-interface capacity could lead to degraded performance, such as lower throughput, and associated user-experience issues.

Further, this problem may be worse for a base station that is configured with a great number of antennas, as the great number of antennas could require a great number of respective reference signals, which could result in substantial resource-element consumption. For instance, the problem might be particularly significant where a base station implements a massive-MIMO antenna array.

While a traditional MIMO antenna array may include on the order of 2 to 8 antennas, a massive-MIMO antenna array would include many more antennas, perhaps on the order of tens, hundreds, or even thousands of antennas. For instance, a representative massive-MIMO antenna array could include 128 antennas, of which 64 might be configured as transmit antennas and the other 64 might be configured as receive antennas. With this arrangement, if 4 transmit antennas are used per layer, the massive-MIMO antenna array might support on the order of 16 layers, to facilitate concurrent transmissions to up to 16 UEs (e.g., 8 UEs with 2 layers apiece, or 16 UEs with 1 layer apiece) or transmission to a single UE with up to 16 layers, among other possibilities. However, if the base station provides numerous distinct antenna paths and would need to receive UE channel estimates to facilitate MIMO and/or beamforming service, the base station may need to provide numerous distinct reference signals, which may result in significant resource-element consumption and significant associated capacity issues.

Disclosed herein is an improvement to help address this issue.

In accordance with the disclosure, a base station or an associated control entity could determine when base station's air interface on one or more carriers is threshold highly loaded or is predicted to be threshold highly loaded and could responsively reduce the number of transmit antennas that the base station uses. Further, the base station or associated control entity could determine when the base station's air interface is no longer actually or predicted to be threshold highly loaded and could responsively increase the number of transmit antennas that the base station uses, such as by reverting the base station to use a default number of antennas.

For instance, at a time when the base station's air interface has or is predicted to have threshold high resource utilization, the number of transmit antennas used by the base station could be reduced from 64 to 32, from 32 to 16, from 16 to 8, from 8 to 4, or from 4 to 2, among other possibilities. And at a time when the base station's air interface has or is predicted to no longer have threshold high resource utilization, the number of transmit antennas used by the base station could be reverted to a default number.

Reducing the number of transmit antennas used by the base station when the base station's air interface is threshold highly loaded could result in a reduction of the number of associated reference signals that the base station transmits, which could therefore result in a reduction of the associated resource-element consumption and in an increase in available air-interface capacity.

To facilitate this, the base station or an associated control entity could track the base station's air-interface resource utilization per time of day and, based on that data, could develop a prediction of times of day when the resource utilization will be at various levels, such as when it will be threshold high. The base station or associated entity could then apply that prediction to determine that at a current or approaching time of day, the base station is likely to have a particular level of resource utilization. Alternatively, the base station or associated entity could determine an actual current level of the base station's air-interface resource utilization, such as an average utilization over a most recent sliding window for instance.

Upon detecting (actually or by prediction) that the base station has particular level of air-interface resource utilization, the base station could then responsively configure itself to use an associated number of transmit antennas. For instance, upon detecting that the air-interface resource utilization is threshold high, the base station could disable a proper subset (less than all) of its transmit antennas, such as by powering-off a power amplifier associated with each such transmit antenna, while leaving a remainder of the base station's transmit antennas enabled (e.g., leaving their associated power amplifiers powered on). And upon detecting that the air-interface resource utilization is no longer threshold high, the base station could re-enable each such disabled transmit antenna.

With an antenna array, disabling a proper subset of the transmit antennas while leaving a remainder of the transmit antennas enabled results in a reduction in effective size of the massive-MIMO array. For instance, if the array has 64 transmit antennas, the array could be considered to have a first effective array size of 64 transmit antennas. Whereas, with a proper subset of those antennas disabled, the massive-MIMO array may be considered to have a second effective array size smaller than the first effective array size.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
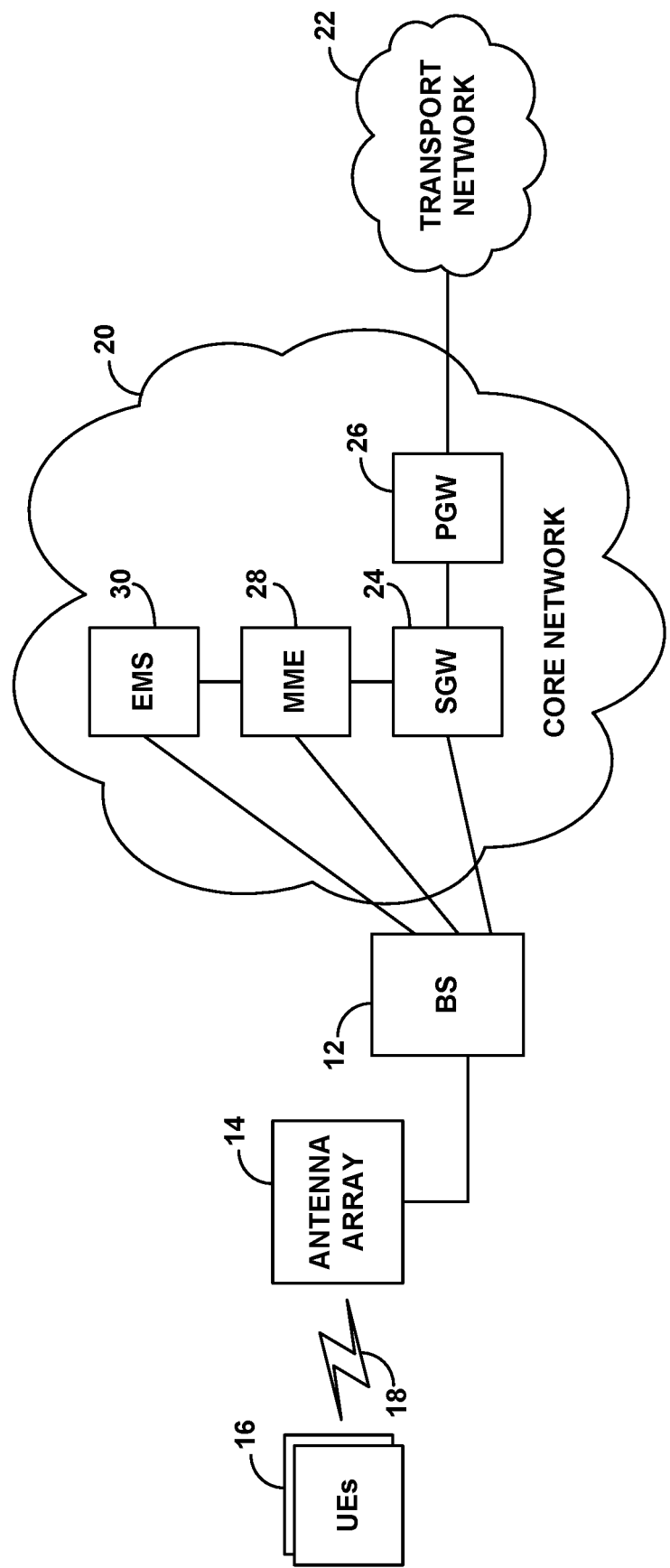
FIG. 1 is a simplified block diagram of a wireless communication system in which various disclosed features can be implemented.

Referring to the drawings, as noted above, FIG. 1 is a simplified block diagram of an example wireless communication system in which various disclosed features can be implemented. It should be understood, however, that numerous variations from this and other disclosed arrangements and operations are possible. For example, elements or operations could be added, removed, combined, distributed, or otherwise modified. In addition, operations described as being performed by one or more entities could be implemented in various ways, such as by a processor executing instructions stored in non-transitory data storage, along with associated circuitry or other hardware, for instance.

As shown in FIG. 1, the example wireless communication system includes a base station 12 having an antenna array 14 through which to serve UEs 16 over an air interface 18.

Base station 12 could take various forms. For example, the base station could be a macro base station of the type that would typically include a tower mounted antenna structure for providing a broad range of coverage. Or the base station could be a small cell base station, femtocell base station, relay base station, or other type of base station that might have a smaller form factor with an antenna structure that provides a narrower range of coverage.

Base station 12 is shown coupled with an example core network 20. Core network 20 could be an evolved packet core (EPC) network, a next generation core (NGC) network, or another network including components supporting an applicable radio access technology and providing connectivity with at least one transport network 22, such as the Internet. Further, the core network could support packet-based communication and communication interfaces between various entities.

In an example implementation, the core network 20 includes a serving gateway (SGW) 24, a packet data network gateway (PGW) 26, and a mobility management entity (MME) 28. As shown, for instance, the base station could be interfaced with the SGW and with the MME, the MME could be interfaced with the SGW, the SGW could be interfaced with the PGW, and the PGW could provide connectivity with the transport network. With this arrangement, the SGW and PGW could cooperatively provide user-plane connectivity between the base station and the transport network, to enable a UE served by a base station to engage in communication on the transport network. And the MME could operate as a controller to carry out operations such as coordinating UE attachment and setup of user-plane bearers.

Further, the example core network 20 could include an element management system (EMS) 30, which could function to receive and store operational data regarding various elements of the system and to direct associated changes in operation. In practice, the base station could have an interface with the EMS as shown and could report to the EMS certain operational data, such measurements of the base station's air-interface resource utilization per unit time and per time of day, among other possibilities. Further, the EMS could be configured with a processing unit programmed to evaluate various operational data and to responsively manage network elements, such as to direct changes in configuration of the base station.

As noted above, the air interface between the base station and UEs served by the base station could be provided on one or more carriers and, on each carrier, could be structured to define various air-interface resources.

By way of example, in the time domain, the air interface on each carrier could define a continuum of 10-millisecond (ms) frames, each divided into ten 1-ms subframes, and each subframe could be further divided into a number of timeslots, each additionally divided into symbol time segments. And in the frequency domain, the frequency bandwidth of each carrier could be divided into subcarriers with specified subcarrier spacing on the order of 15 to 240 kHz. With this arrangement, as noted above, the air interface on each carrier would define an array of resource elements each occupying a subcarrier a symbol time segment, and the base station and UEs could communicate with each other through modulation of the subcarriers to carry data in those resource elements. Variations of this arrangement are possible as well.

Further, particular sets of resource elements on the air interface could be grouped together to define the PRBs discussed above. In an example implementation, each PRB could span one timeslot in the time domain and a group of subcarriers in the frequency domain. Depending on the carrier bandwidth, the air interface could thus support a certain number of such PRBs across the bandwidth of the carrier within each timeslot.

In addition, certain resource elements could be reserved for special uses. On the downlink for instance, resource elements of the first one, two, or three symbol time segments per subframe could be generally reserved to define a downlink control region for carrying control signaling such as scheduling directives and acknowledgements from the base station to UEs. And resource elements of the remaining symbol time segments per subframe could be generally reserved to define a downlink shared channel in which the PRBs could carry scheduled data communications from the base station to UEs. Further, certain resource elements in each downlink subframe or in particular downlink subframes could be reserved to carry special signals, such as synchronization signals, broadcast-channel signals, and—of particular interest for the present disclosure—reference signals.

When a UE enters into coverage of the base station on a carrier, the UE could detect threshold strong coverage of a base station (e.g., a threshold strong reference signal broadcast by the base station) and could then engage in random-access and Radio Resource Control (RRC) signaling with the base station to establish an RRC connection through which the base station will then serve the UE.

In addition, once the UE is connected with the base station, the UE could then transmit to the base station an attach request if appropriate, which the base station could forward to the MME for processing. And after authenticating the UE, the MME could coordinate setup for the UE of a user-plane bearer between the base station and the PGW, to enable the UE to engage in communication on the transport network. Further, the base station could coordinate setup for the UE of a corresponding data radio bearer between the UE and the base station, and the base station could record the operational state of the UE.

Once the UE is so connected and attached, the base station could then serve the UE with data communications. On the downlink, for instance, when data arrives at the base station for transmission to the UE, the base station could select one or more downlink PRBs in a subframe for use to transmit at least a portion of the data, defining a transport block, to the UE. The base station could then transmit to the UE in the control region of that subframe a Downlink Control Information (DCI) message that designates the PRBs, and the base station could accordingly transmit the transport block to the UE in those designated PRBs, modulating the data on subcarriers of the resource elements of the PRBs.

As the base station serves one or more RRC-connected UEs, the base station could fairly allocate the downlink PRBs of its air interface for use to carry data to the UEs, assigning PRBs to individual UEs or, using MU-MIMO, to groups of UEs as necessary. As a result, the base station's air interface may have varying extents of load.

The base station's air-interface load could be defined in terms of the quantity of PRBs or other resources of the air-interface that are allocated and used for carrying user data (e.g., downlink packet-data or other scheduled downlink communications) per unit time, such as per subframe, frame, or sliding window of time. For instance, the load could be defined in terms of a percentage of the air-interface's downlink PRBs that the base station allocates per unit time. Alternatively or additionally, the load could be defined in terms of how much data the base station has buffered per unit time awaiting downlink transmission and/or how much time the base station has buffered such data before transmitting it, as a greater extent of data buffering could correspond with higher air-interface resource utilization and associated lower resource availability. Other load metrics could be possible as well.

In practice, the base station could keep track of its air-interface load and could report its air-interface load to the EMS. Further, the base station and/or EMS could statistically roll up the load data to establish statistical measures of the base station's air-interface load on a per time-of-day basis or the like. Such measures could then be used as a basis to predict that at a given time of day, a given base station is likely to have a particular level of air-interface load. For instance, the measures could be used as a basis to predict that at a current time of day, the base station is likely to have a predefined threshold high level of air-interface load (e.g., having PRB utilization that is greater than a threshold percentage deemed to represent threshold high load). Further, scheduled events and/or other factors may be used as a basis to predict when a base station is likely to have threshold high air-interface load.

Figure 2:
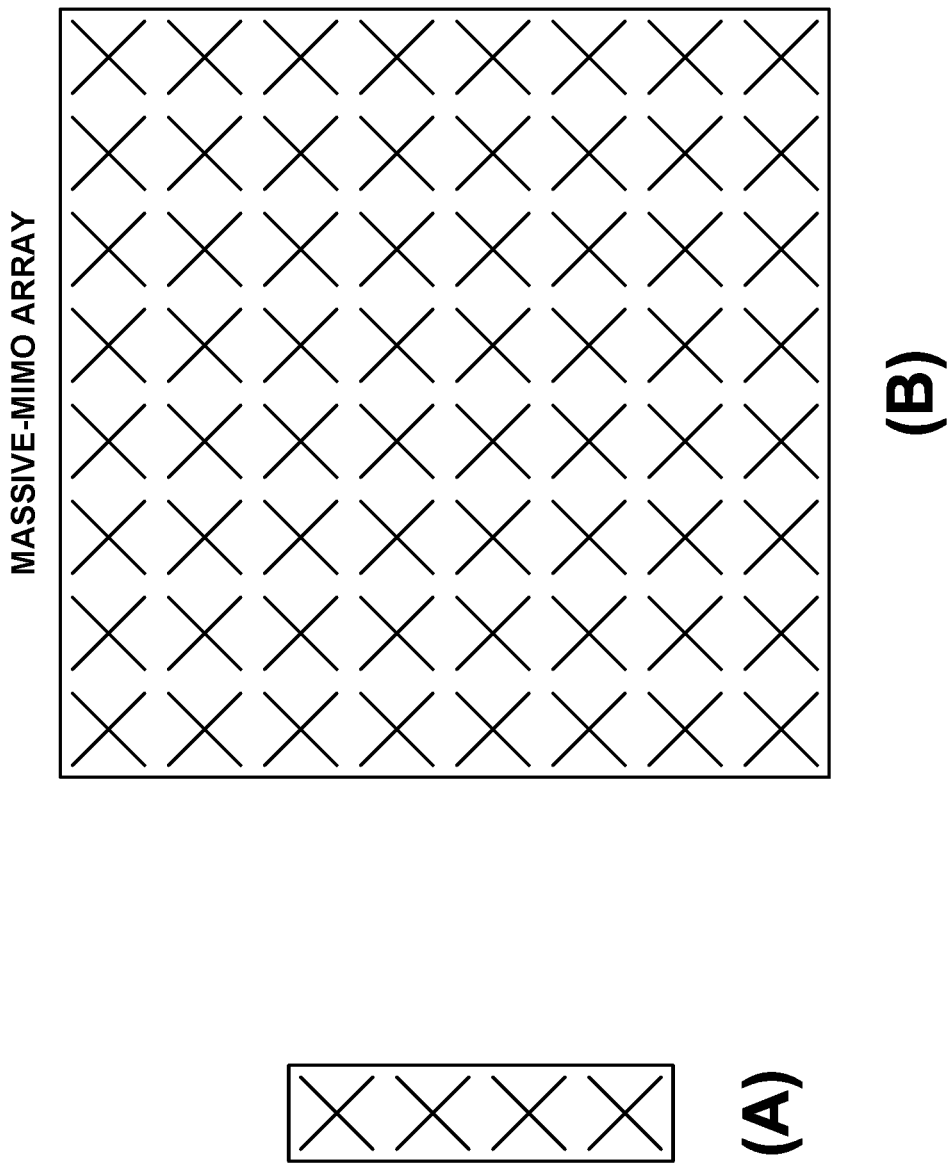
FIG. 2 is a simplified diagram of example antenna arrays that could be implemented in the context of the disclosure.

As noted above, the base station is configured to engage in air-interface communication through an antenna array 14, which could comprise multiple transmit antennas and multiple receive antennas. FIG. 2 depicts two examples of such an antenna array.

In FIG. 2, each illustrated X represents two antennas (or antenna elements), one with positive polarization and one with negative polarization. With each such arrangement, some of the antennas might be configured as transmit (downlink) antennas, and others might be configured as receive (uplink) antennas. For instance, all of the antennas with positive polarization might be configured as transmit antennas, and all of the antennas with negative polarization might be configured as receive antennas.

In particular, FIG. 2A illustrates an example antenna array having a single column of antennas including four antennas with positive polarization and four antennas with negative polarization, so that the array might be configured to have four transmit antennas and four receive antennas. And FIG. 2B illustrates a massive-MIMO array having eight columns of antennas with each column including eight antennas with positive polarization and eight antennas with negative polarization, so that the array might be configured to have 64 transmit antennas and 64 receive antennas. Other array configurations are possible as well.

With a representative antenna array, each transmit antenna could have its own respective amplifier for amplifying RF signals to be transmitted by the antenna, or groups of antennas may be grouped together and served by a common amplifier (which might be configured to amplify RF signals separately destined to individual antennas or sub-groups of antennas within the group). Further, the base station could be configured to dynamically control these amplifiers, in order to control the level of amplification or, for present purposes, to selectively disable and enable certain antennas to help control air-interface utilization.

Figure 3:
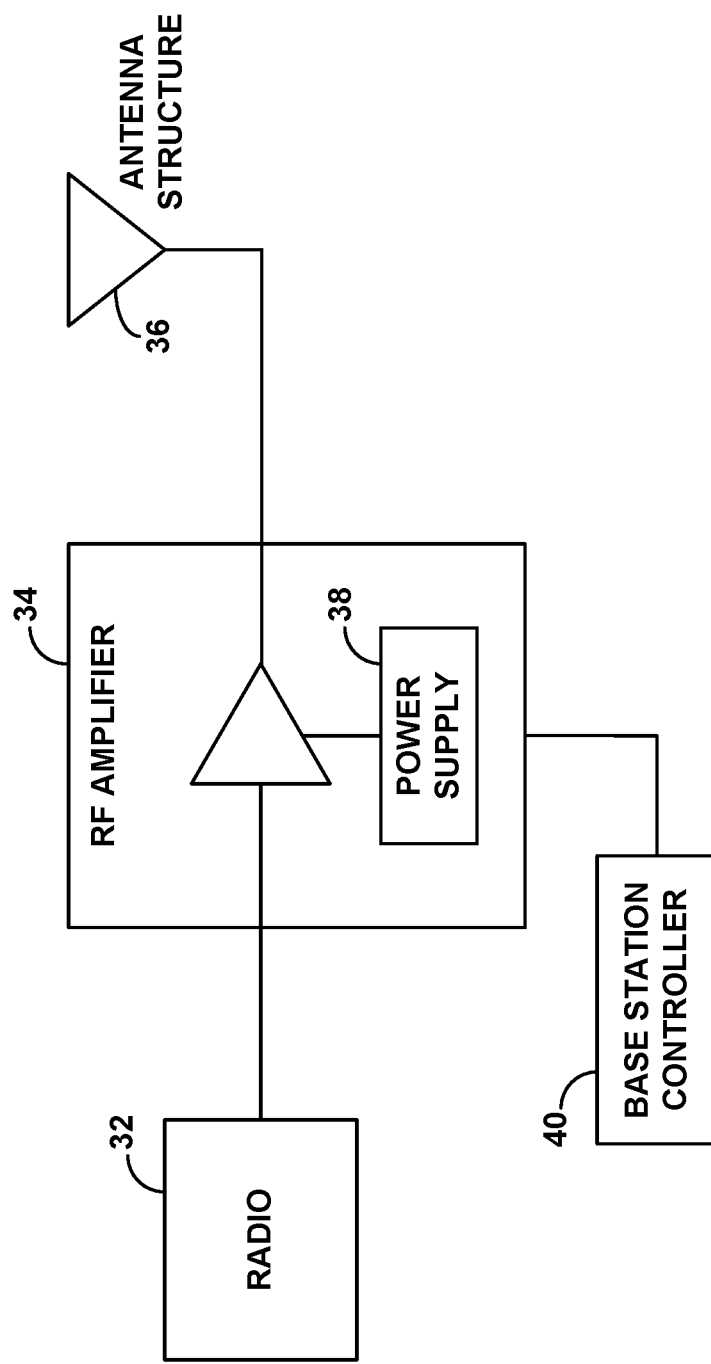
FIG. 3 is a simplified circuit diagram depicting an example RF chain for a respective antenna structure of the example antenna array.

FIG. 3 is a simplified circuit diagram depicting an example RF chain that could be provided for a respective antenna structure, such as for a single antenna or a group of antennas.

As shown in FIG. 3, the example RF chain includes a radio 32, an RF amplifier 34, and an antenna structure 36. Radio 32 could operate to modulate signals onto an RF carrier, RF amplifier 34 could then operate to amplify the modulated RF carrier, and antenna structure 36 could operate to transmit the amplified RF carrier over the air for receipt by one or more UEs. As further shown, the RF amplifier could include (or otherwise interoperate with) a power supply 38, which could be connected with an alternating-current power source and could supply power to drive the RF amplifier. And the base station could include a controller 40 in communication with the RF amplifier, to control the level of amplification provided by the amplifier and to turn the amplifier on and off when desired. Powering off the amplifier could involve effectively opening a circuit between the amplifier and its power supply 38, so that the power supply does not supply power to the amplifier, or powering off the amplifier could be accomplished in other ways. Further, note that the RF amplifier could be configured as a matched load for downlink signaling from the radio while the RF amplifier is powered off, so as to dissipate downlink RF signals and help avoid RF reflections.

As also noted above, to facilitate MIMO service or the like, the base station could be configured to transmit from each of its transmit antennas a respective reference signal that UEs could use as a basis to provide associated channel estimates. Further, as indicated above, each such reference signal could occupy respective resource elements of the base station's air interface, which means that the more transmit antennas the base station uses, the more resource elements of the air interface may be consumed by the associated reference signals and may therefore be unavailable for other use such as to carry scheduled data communications.

Figure 4:
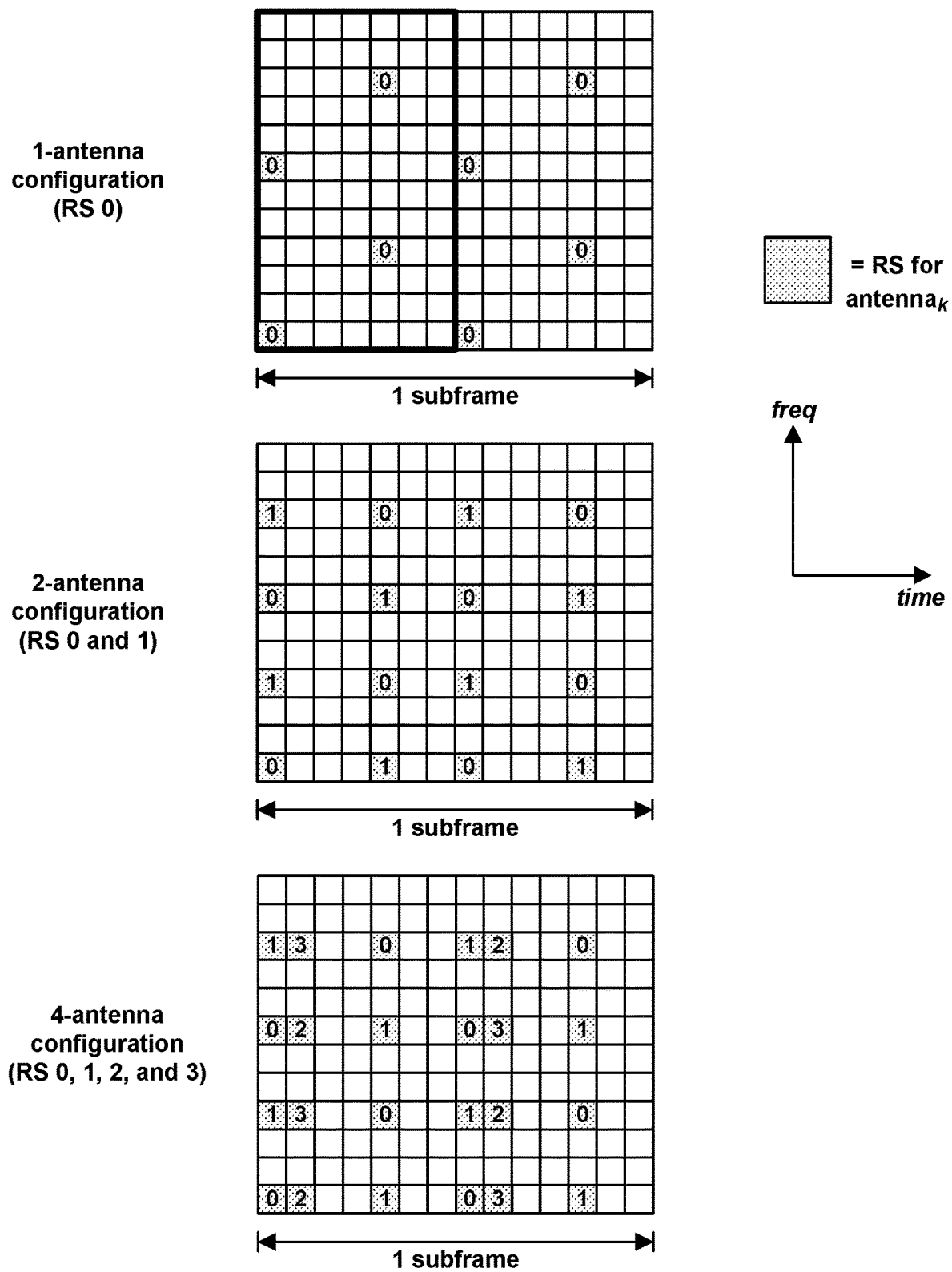
FIG. 4 is a simplified illustration of a portion of an example subframe, depicting how resource-element consumption could increase as the base station uses more transmit antennas.

FIG. 4 is a simplified illustration of a portion of an example subframe, to help show how the level of resource-element consumption could increase as the base station uses more transmit antennas. In particular, FIG. 4 depicts the example subframe as defining an array of resource elements, where each PRB spans 7 resource elements in time and 12 resource elements in frequency, thus encompassing 84 resource elements. And FIG. 4 shows varying example resource-element consumption resulting from reference signals transmitted respectively in a 1-antenna configuration, in a 2-antenna configuration, and in a 4-antenna configuration.

As shown in FIG. 4, if the base station uses just one transmit antenna and provides an associated reference signal, that reference signal might consume four resource elements per PRB, thus about 5% of the air-interface capacity. Whereas, if the base station uses two transmit antennas and provides a reference signal respectively per transmit antenna, those reference signals might cooperatively consume 8 resource elements per PRB, thus about 9% of the air-interface capacity. And if the base station uses four transmit antennas and provides a reference signal respectively per transmit antenna, those reference signals might cooperatively consume 12 resource elements per PRB, thus about 14% of the air-interface capacity. Extrapolating this to the massive-MIMO array of FIG. 2B, if the base station were to use 64 transmit antennas and were to provide a reference signal respectively for each such transmit antenna, depending on how the reference signals were configured, they might cooperatively consume on the order of 48% of the air-interface capacity.

As noted above, to help limit such resource consumption at times when the base station's air interface is highly loaded (e.g., in terms of PRB utilization or extent of data buffering), the base station could dynamically control the number of transmit antennas that it uses.

In particular, when the air interface is threshold highly loaded, the base station could responsively reduce the number of transmit antennas that the base station uses, so as to reduce the number of associated reference signals that the base station transmits and to thereby help to reduce the extent of associated resource consumption and to increase air-interface capacity. Whereas, when the air interface is not threshold highly loaded, the base station could responsively increase the number of transmit antennas that the base station uses, such as by reverting to a default number of antennas that the base station used before a reduction.

The base station could control the number of transmit antennas that it uses by selectively powering on or off various associated RF amplifiers or in another manner, as noted above.

Further, the base station could be set with configurable thresholds of its air-interface load and with corresponding numbers of transmit antennas to use per level of load, and the base station could apply those thresholds and accordingly control the number of transmit antennas that it uses. Or the EMS or another such entity could be configured with such thresholds and to apply those thresholds and accordingly direct and thus cause the base station to change its number of transmit antennas when appropriate.

For example, with the arrangement of FIG. 2A, the base station could (i) by default use all four of its transmit antennas, (ii) use just two of its transmit antennas by powering off the other two transmit antennas in response to its actual or predicted PRB-utilization being above 75%, and (iii) revert to using all four of its transmit antennas by powering back on those two transmit antennas in response its actual or predicted PRB-utilization dropping to below 75%, with possibly hysteresis. And as another example, with the arrangement of FIG. 2B, the base station could (i) use all 64 of its transmit antennas when its actual or predicted PRB-utilization is below 30%, (ii) use just 32 of its transmit antennas when to its actual or predicted PRB-utilization is between 30% and 50%, (iii) use just 16 of its transmit antennas when its actual or predicted PRB-utilization is between 50% and 75%, and so forth. Of course, numerous other examples are possible as well.

Figure 5:
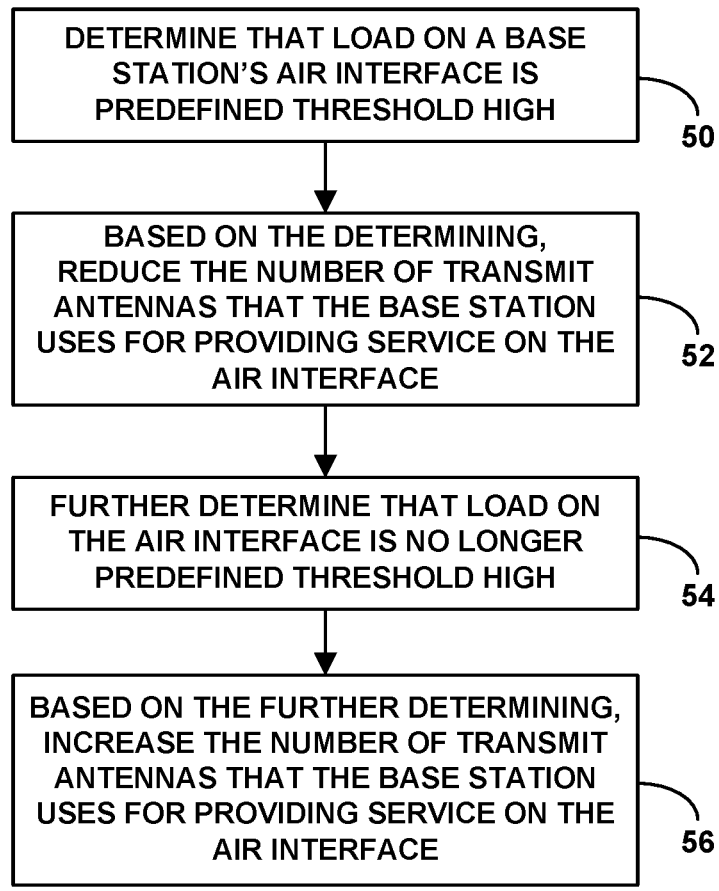
FIG. 5 is a flow chart depicting example operations in accordance with the disclosure.

FIG. 5 is next a flow chart depicting an example method that can be carried out in accordance with the present disclosure to control use of an air interface on which a base station is configured to serve UEs, where the air interface occupies one or more carriers and defines air-interface resources, and where the base station provides service on the air interface using a number of transmit antennas. This method could be carried out by a computing system, such as by the base station or by the EMS or other entity in cooperation with the base station.

As shown in FIG. 5, at block 50, the method includes a computing system determining that load on the air interface is predefined threshold high. And at block 52, the method includes, based on the determining, the computing system reducing the number of transmit antennas that the base station uses for providing service on the air interface. In at block 54, the method includes, after reducing the number of transmit antennas, the computing system further determining that load on the air interface is no longer predefined threshold high. And at block 56, the method includes, based on the further determining, the computing system increasing the number of transmit antennas that the base station uses for providing service on the air interface.

In line with the discussion above, the air-interface resources defined by the air interface could comprise PRBs, and the predefined threshold high load could comprise predefined threshold high PRB-utilization. Alternatively or additionally, the base station could be configured to buffer data for transmission on the air interface, and the act of determining that load on the air interface is predefined threshold high could involve detecting predefined threshold high extent of the buffering. Further, as discussed above, the act of detecting that load on the air interface is predefined threshold high could involve predicting the predefined threshold high load and/or determining that actual load on the air interface is predefined threshold high.

In addition, as discussed above, the act of reducing the number of transmit antennas could involve causing the base station to disable one or more of the transmit antennas. And the base station could be configured with an antenna array such as a massive-MIMO antenna array, in which case the act of reducing the number of transmit antennas could involve reducing an effective size of the base station's antenna array.

Further, as discussed above, from each transmit antenna that the base station uses for providing service on the air interface, the base station could transmit a respective reference signal that consumes resource elements of the air interface, in which case reducing the number of transmit antennas that the base station uses for providing service on the air interface could result in reducing a number of associated reference signals that the base station transmits and thus reducing resource-element consumption.

Still further, as noted above, the computing system could be provided as part of the base station and/or external to the base station (e.g., at an EMS or other entity). And if the computing system is provided at least partly external to the base station, the act of the base station reducing the number of transmit antennas that the base station uses for providing service on the air interface could involve transmitting to the base station a directive to which the base station is configured to respond by reducing the number of transmit antennas that the base station uses for providing service on the air interface.

Figure 6:
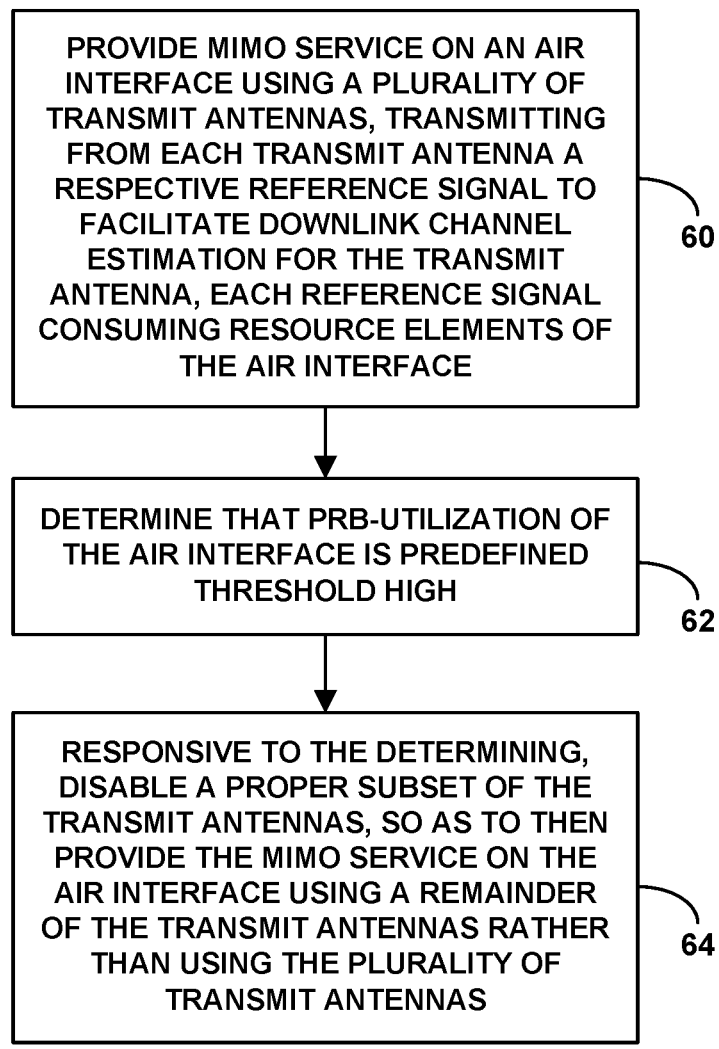
FIG. 6 is another flow chart depicting example operations in accordance with the disclosure.

FIG. 6 is next a flow chart depicting an example method that can be carried out in accordance with the present disclosure to control use of an air interface on which a base station is configured to serve UEs, where the air interface occupies one or more carriers and defines PRBs, and where the base station provides service on the air interface using a number of transmit antennas, such as antennas of a massive-MIMO antenna array for instance.

As shown in FIG. 6, at block 60, the method includes the base station providing MIMO service on the air interface using a plurality of transmit antennas, where the base station transmits from each transmit antenna a respective reference signal to facilitate downlink channel estimation for the transmit antenna (i.e., for transmission from the transmit antenna) and where each reference signal consumes resource elements of the air interface. At block 62, the method then includes determining that PRB-utilization of the air interface is predefined threshold high. And at block 64, the method includes, responsive to the determining, the base station disabling a proper subset of the transmit antennas, such that the base station then provides the MIMO service on the air interface using a remainder of the transmit antennas rather than using the plurality of transmit antennas. As discussed above, disabling the proper subset of the transmit antennas could thereby result in reducing a number of associated reference signals that the base station transmits and thus reducing resource-element consumption.

In line with the discussion above, this method could further include, after disabling the proper subset of the transmit antennas, further determining that PRB-utilization of the air interface is no longer predefined threshold high and, based on the further determining, re-enabling by the base station the disabled transmit antennas.

Further, the method could additionally include the base station maintaining a mapping between levels of PRB-utilization and associated quantities of the transmit antennas to be used—such as by being programmed with the mapping and/or configured with reference data defining the mapping, among other possibilities. And the method could include the base station referring to the mapping in order to determine a quantity of the transmit antennas to be used given a current PRB-utilization of the air interface. Further, the method could include, based on the determined quantity, the base station deciding to carry out the disabling of the proper subset of the transmit antennas so as to leave as remaining enabled transmit antennas the determined quantity of transmit antennas.

Figure 7:
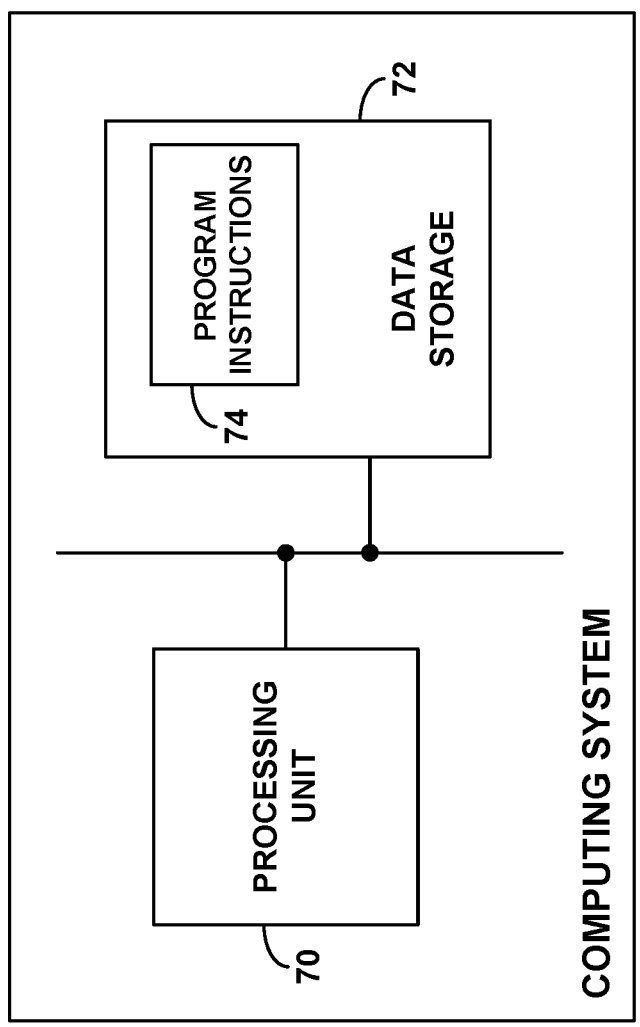
FIG. 7 is a simplified block diagram of a system operable in accordance with the disclosure.

Finally, FIG. 7 is a simplified block diagram of an example system for controlling use of an air interface on which a base station is configured to provide service, where the base station includes a plurality of transmit antennas. In line with the discussion above, this system could be implemented at the base station, at the EMS, and/or at one or more other entities.

As shown in FIG. 7, the example system includes a processing unit 70 (e.g., one or more general purpose processors and/or dedicated processors), non-transitory data storage 72 (e.g., one or more volatile and/or non-volatile storage components, such as magnetic, optical, or flash storage), and program instructions 74 stored in the non-transitory data storage 72 and executable by the processing unit 70 to carry out various operations described above.

Exemplary embodiments have been described above. Those skilled in the art will understand, however, that changes and modifications may be made to these embodiments without departing from the true scope and spirit of the invention. Further, it should be understood that various embodiments described above could be combined together, with features of one or more embodiments being carried out in the context of one or more other embodiments, and vice versa.

We claim:

1. A method of controlling use of an air interface on which a base station is configured to serve user equipment devices (UEs), wherein the air interface defines air-interface resources, and wherein the base station provides service on the air interface using a number of transmit antennas, the method comprising:
    determining by a computing system that load on the air interface is predefined threshold high; and
    based on the determining, reducing by the computing system the number of transmit antennas that the base station uses for providing service on the air interface.

2. The method of claim 1, further comprising, after reducing the number of transmit antennas:
    further determining by the computing system that load on the air interface is no longer predefined threshold high; and
    based on the further determining, increasing by the computing system the number of transmit antennas that the base station uses for providing service on the air interface.

3. The method of claim 1, wherein the air-interface resources comprise physical resource blocks (PRBs), and wherein the predefined threshold high load comprises predefined threshold high PRB-utilization.

4. The method of claim 1, wherein the base station is configured to buffer data for transmission on the air interface, and wherein determining that load on the air interface is predefined threshold high comprises detecting a predefined threshold high extent of the buffering.

5. The method of claim 1, wherein detecting that load on the air interface is predefined threshold high comprises an action selected from the group consisting of (i) predicting the predefined threshold high load and (ii) determining that actual load on the air interface is predefined threshold high.

6. The method of claim 1, wherein reducing the number of transmit antennas comprises causing the base station to disable one or more of the transmit antennas.

7. The method of claim 1, wherein the base station is configured with an antenna array, and wherein reducing the number of transmit antennas comprise reducing an effective size of the antenna array.

8. The method of claim 7, wherein the antenna array is a massive multiple-input-multiple-output (massive-MIMO) antenna array.

9. The method of claim 1, wherein from each transmit antenna that the base station uses for providing service on the air interface, the base station transmits a respective reference signal that consumes resource elements of the air interface, and wherein reducing the number of transmit antennas that the base station uses for providing service on the air interface results in reducing a number of associated reference signals that the base station transmits and thus reducing resource-element consumption.

10. The method of claim 1, wherein the computing system is part of the base station.

11. The method of claim 1, wherein the computing system is provided external to the base station, wherein reducing by the computing system the number of transmit antennas that the base station uses for providing service on the air interface comprises transmitting to the base station a directive to which the base station is configured to respond by reducing the number of transmit antennas that the base station uses for providing service on the air interface.

12. The method of claim 1, wherein the air interface occupies a plurality of carriers.

13. A method for controlling use of an air interface on which a base station is configured to serve user equipment devices (UEs), wherein the air interface defines physical resource blocks (PRBs), the method comprising:

providing by the base station multiple-input-multiple-output (MIMO) service on the air interface using a plurality of transmit antennas, wherein the base station transmits from each transmit antenna a respective reference signal to facilitate downlink channel estimation for the transmit antenna, and wherein each reference signal consumes resource elements of the air interface;

determining that PRB-utilization of the air interface is predefined threshold high;

responsive to the determining, disabling by the base station a proper subset of the transmit antennas, wherein the base station then provides the MIMO service on the air interface using a remainder of the transmit antennas rather than using the plurality of transmit antennas, wherein disabling the proper subset of the transmit antennas results in reducing a number of associated reference signals that the base station transmits and thus reducing resource-element consumption.

14. The method of claim 13, further comprising, after disabling the proper subset of the transmit antennas:

further determining that PRB-utilization of the air interface is no longer predefined threshold high; and based on the further determining, re-enabling by the base station the disabled transmit antennas.

15. The method of claim 13, wherein the plurality of transmit antennas are of a massive-MIMO antenna array.

16. The method of claim 13, wherein the air interface spans a plurality of carriers.

17. The method of claim 13, further comprising:

maintaining by the base station a mapping between levels of PRB-utilization and associated quantities of the transmit antennas to be used;

referring by the base station to the mapping to determine a quantity of the transmit antennas to be used given a current PRB-utilization of the air interface; and based on the determined quantity, determining by the base station to disable the proper subset of the transmit antennas, leaving as remaining enabled transmit antennas the determined quantity of transmit antennas.

18. A system for controlling use of an air interface on which a base station is configured to provide service, wherein the base station includes a plurality of transmit antennas, the system comprising:

a processing unit;

non-transitory data storage;

program instructions stored in the non-transitory data storage and executable by the processing unit to carry out operations including:

determining that load on the air interface is predefined threshold high; and based on the determining, reducing the number of transmit antennas that the base station uses for providing service on the air interface.

19. The system of claim 18, wherein the operations further comprise:

after reducing the number of transmit antennas, further determining that load on the air interface is no longer predefined threshold high; and based on the further determining, increasing the number of transmit antennas that the base station uses for providing service on the air interface.

20. The system of claim 18, provided at the base station.

* * * * *